United States Patent
Sotome et al.

(10) Patent No.: US 11,827,084 B2
(45) Date of Patent: Nov. 28, 2023

(54) SUN VISOR HOLDER

(71) Applicant: PIOLAX, INC., Kanagawa (JP)

(72) Inventors: Yukihiro Sotome, Kanagawa (JP);
Hikaru Kiyota, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 17/638,004

(22) PCT Filed: Sep. 3, 2019

(86) PCT No.: PCT/JP2019/034663
§ 371 (c)(1),
(2) Date: Feb. 24, 2022

(87) PCT Pub. No.: WO2021/044530
PCT Pub. Date: Mar. 11, 2021

(65) Prior Publication Data
US 2022/0274469 A1  Sep. 1, 2022

(51) Int. Cl.
*B60J 3/02* (2006.01)
(52) U.S. Cl.
CPC ................... *B60J 3/0213* (2013.01)
(58) Field of Classification Search
CPC ............................ B60J 3/0213; B60J 3/023
USPC ...................................... 296/97.9
See application file for complete search history.

(56) References Cited

U.S. PATENT DOCUMENTS

| 6,324,732 B1 * | 12/2001 | Arisaka ..................... B60J 3/023 24/453 |
| 9,403,420 B2 * | 8/2016 | Machida ............... F16B 21/086 |
| 10,988,003 B2 * | 4/2021 | Baxter ..................... B60J 3/023 |
| 2015/0283884 A1 | 10/2015 | Machida |

FOREIGN PATENT DOCUMENTS

| JP | 2010255731 | * 11/2010 |
| JP | 2010-276031 A | 12/2010 |
| JP | 5853105 B2 | 2/2016 |
| JP | 2016-035307 A | 3/2016 |

OTHER PUBLICATIONS

Nov. 5, 2019, International Search Report issued for related PCT application No. PCT/JP2019/034663.
Nov. 5, 2019, International Search Opinion issued for related PCT application No. PCT/JP2019/034663.

* cited by examiner

Primary Examiner — Joseph D. Pape
(74) Attorney, Agent, or Firm — Paratus Law Group, PLLC

(57) ABSTRACT

A sun visor holder includes a base portion and leg portion. The leg portion includes a first wall portion and a second wall portion that are vertically disposed from the base portion and face each other. The first wall portion includes a first engaging piece provided with a release portion. The second wall portion includes a pair of second engaging pieces whose base end portions are connected to a tip end side of the second wall portion, and a vertical wall that is disposed between the pair of second engaging pieces and extends in a vertical direction of the second wall portion. Groove portions that extend in the vertical direction of the second wall portion and thin the second wall portion are formed on the second wall portion between each of the second engaging pieces and the vertical wall.

5 Claims, 13 Drawing Sheets

SUN VISOR HOLDER

CROSS REFERENCE TO PRIOR APPLICATION

This application is a National Stage Patent Application of PCT International Patent Application No. PCT/JP2019/034663 (filed on Sep. 3, 2019) under 35 U.S.C. § 371, which is hereby incorporated by reference in its entirety.

TECHNICAL FIELD

The present invention relates to a sun visor holder attached to a mounting hole.

BACKGROUND ART

For example, a vehicle is provided with a sun visor for protecting eyes of an occupant from sunlight or the like. The sun visor is formed such that a shaft that protrudes from both ends in a longitudinal direction of the sun visor is detachably rotated and held by a sun visor holder attached to an inner wall of the vehicle, and is rotated so that the sun visor is disposed in front of a field of vision of the occupant at the time of use.

As the sun visor holder that holds the shaft of the sun visor as described above, the following Patent Literature 1 discloses a sun visor holder including a main body portion and a leg portion that is inserted into and fixed to a mounting hole, in which the main body portion includes a base portion, a holding portion that detachably holds a shaft, and an insertion portion that receives the shaft, the leg portion includes a first engaging piece that is disposed on a side opposite to the insertion portion of the main body portion and engages with the mounting hole, and a pair of second engaging pieces that engage with the mounting hole in cooperation with the first engaging piece, and the first engaging piece can be flexed inward with a tip end side of the leg portion as a fulcrum, and has a release portion that extends outward from a free end side of the first engaging piece.

When the above sun visor holder is removed from the mounting hole, first, the release portion is pressed to flex the first engaging piece inward, and after an engagement between the first engaging piece and the mounting hole is released, an engagement between the mounting hole and the second engaging piece is released, so that the sun visor holder can be removed from the mounting hole.

CITATION LIST

Patent Literature

Patent Literature 1: Japanese Patent No. 5853105

SUMMARY OF INVENTION

Technical Problem

In a case of the above sun visor holder disclosed in Patent Literature 1, an engagement state between the first engaging piece and the mounting hole is released by pressing the release portion, but in the engagement state, the second engaging piece is in a state of being engaged with the mounting hole. Therefore, the leg portion is gradually pulled out from the mounting hole, and the engagement between the second engaging piece and the mounting hole is released while the second engaging piece is flexed, but when the second engaging piece is less likely to be flexed, the second engaging piece may be less likely to be disengaged from the mounting hole.

Accordingly, an object of the present invention to provide a sun visor holder that is easily removed from a mounting hole.

Solution to Problem

In order to achieve the above object, the present invention is a sun visor holder that is attached to a mounting hole and configured to detachably hold a shaft of a sun visor, the sun visor holder including:

a base portion that includes a holding portion holding the shaft and a leg portion that is inserted into and fixed to the mounting hole, wherein the leg portion includes a first wall portion and a second rail portion that are vertically disposed from the base portion and face each other, the first wall portion includes a first engaging piece that is configured to be flexed and deformed by a slit and engages with the mounting hole, and the first engaging piece is provided with a release portion that is configured to release an engagement between the first engaging piece and the mounting hole, the second wall portion is provided with a pair of second engaging pieces whose base end portions are connected to a tip end side of the second wall portion in a vertical direction thereof, and which are configured to be flexed and deformed and are engaged with the mounting hole, and a vertical wall that is disposed between the pair of second engaging pieces and extends in the vertical direction of the second wall portion, and groove portions that extend in the vertical direction of the second wall portion and thin the second wall portion are formed on the second wall portion between each of the second engaging pieces and the vertical wall.

Advantageous Effects of Invention

According to the present invention, when the sun visor holder is removed from the mounting hole, after the release portion is pushed and the engagement between the first engaging piece and the mounting hole is released, the leg portion is gradually pulled out from the mounting hole, and an engagement between the pair of second engaging pieces and the mounting hole is released while the pair of second engaging pieces are flexed and deformed. However, at this time, the groove portions on the second wall portion that extend in the vertical direction of the second wall portion and thin the second wall portion are formed between each of the second engaging pieces and the vertical wall, so that the pair of second engaging pieces can be easily flexed and deformed in a direction approaching the second wall portion, and can also be easily flexed and deformed in directions approaching each other, so that the engagement between the pair of second engaging pieces and the mounting hole can be easily released, and the sun visor holder is easily removed from the mounting hole.

DESCRIPTION OF EMBODIMENTS

Hereinafter, an embodiment of a sun visor holder according to the present invention will be described with reference to the drawings.

Figure 1:
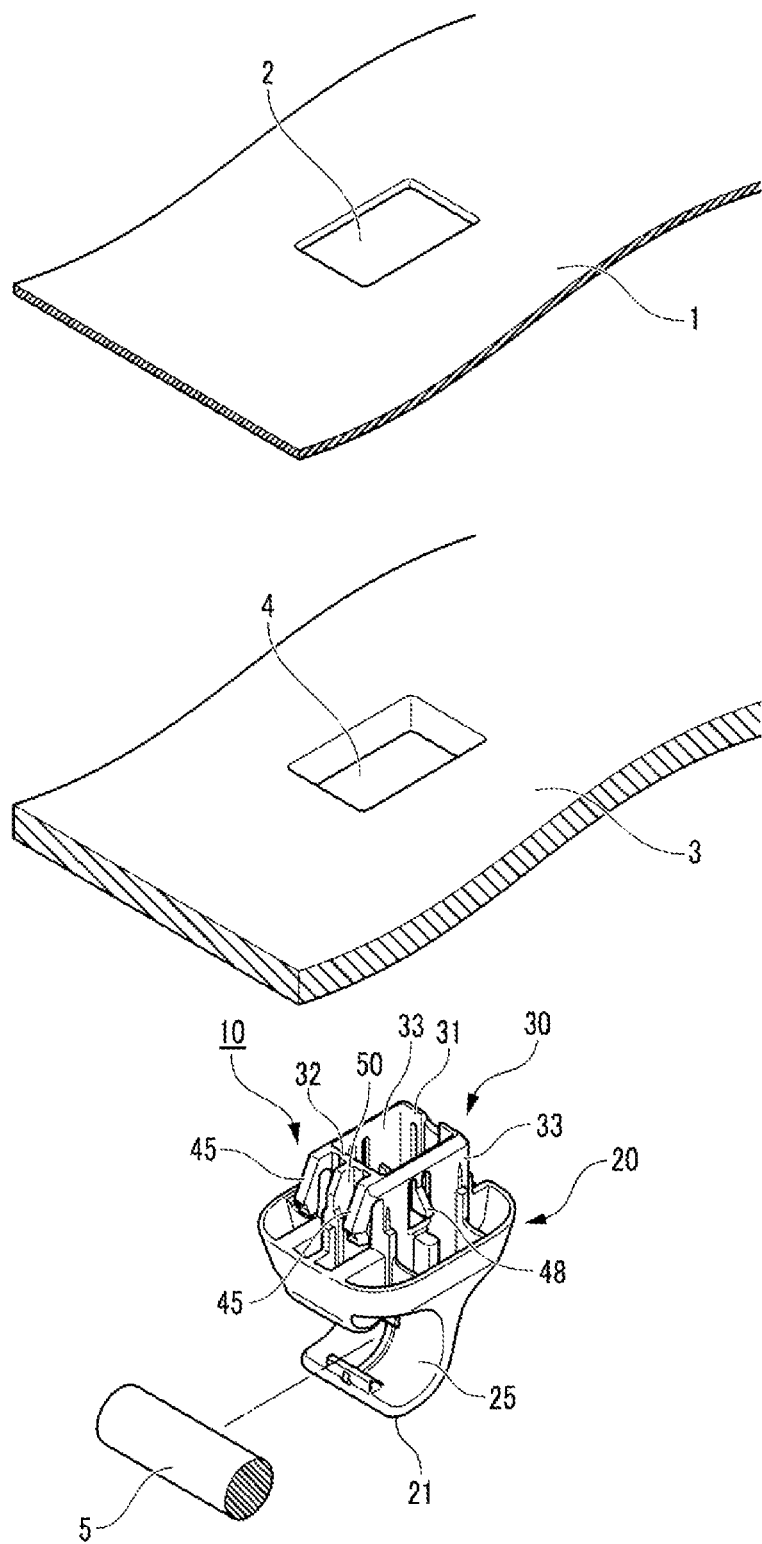
FIG. 1 is a perspective view showing an embodiment of a sun visor holder according to the present invention.

As shown in FIG. 1, a sun visor holder 10 of the embodiment is attached to an inner wall of a vehicle via a rectangular mounting hole 2 formed in a vehicle panel 1, and detachably rotates and holds a shaft 5 that protrudes from both ends in a longitudinal direction of a sun visor (not shown). A trim member 3 is superposed on a front side of the vehicle panel 1. A rectangular insertion hole 4 larger than the mounting hole 2 of the vehicle panel 1 is formed in the trim member 3.

Figure 2:
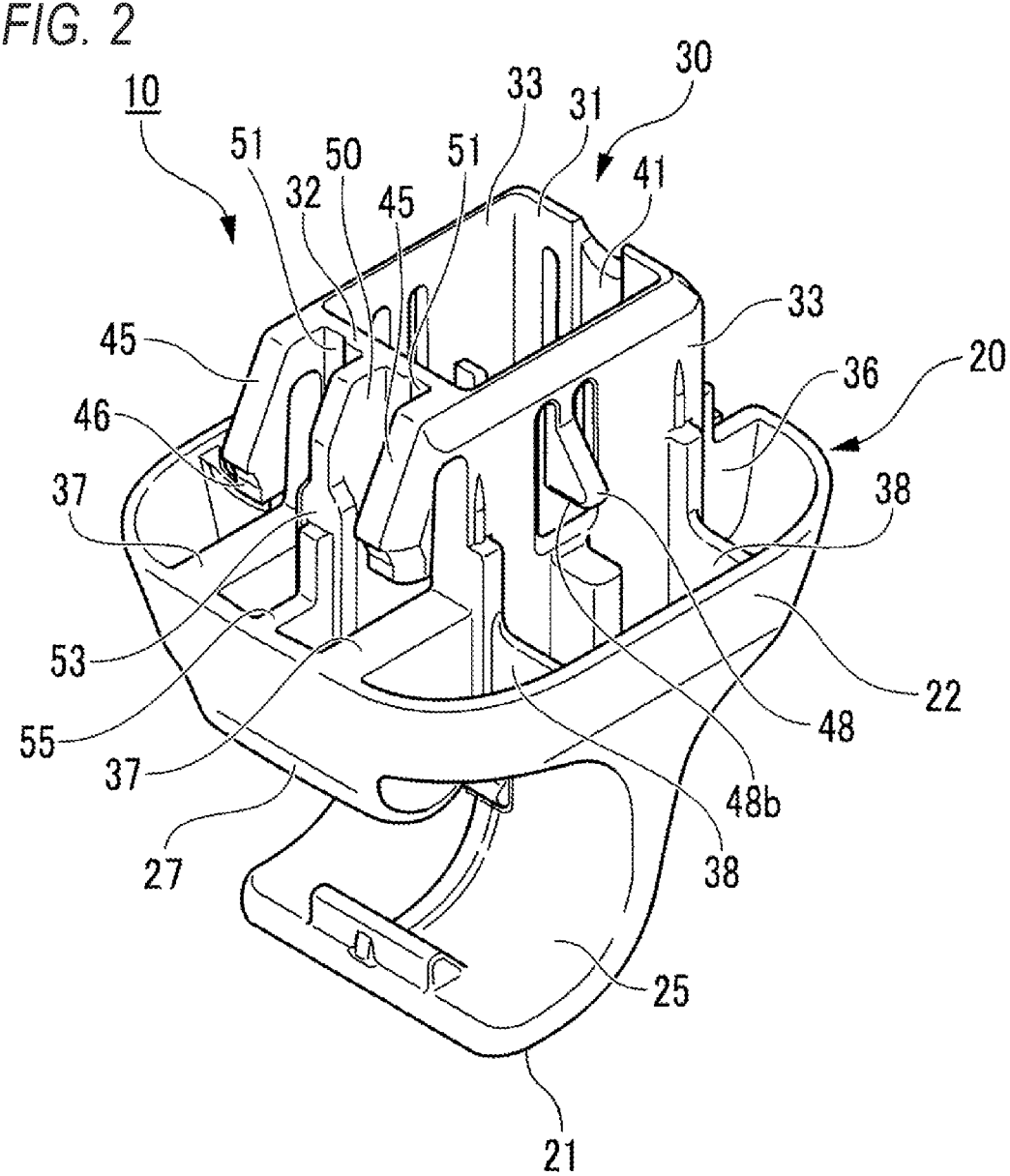
FIG. 2 is an enlarged perspective view of the sun visor holder.

As shown in FIG. 2, the sun visor holder 10 in the embodiment has a base portion 20 having a holding portion 21 that detachably holds the shaft 5 of the sun visor, and a leg portion 30 inserted into and fixed to the mounting hole 2.

Figure 6:
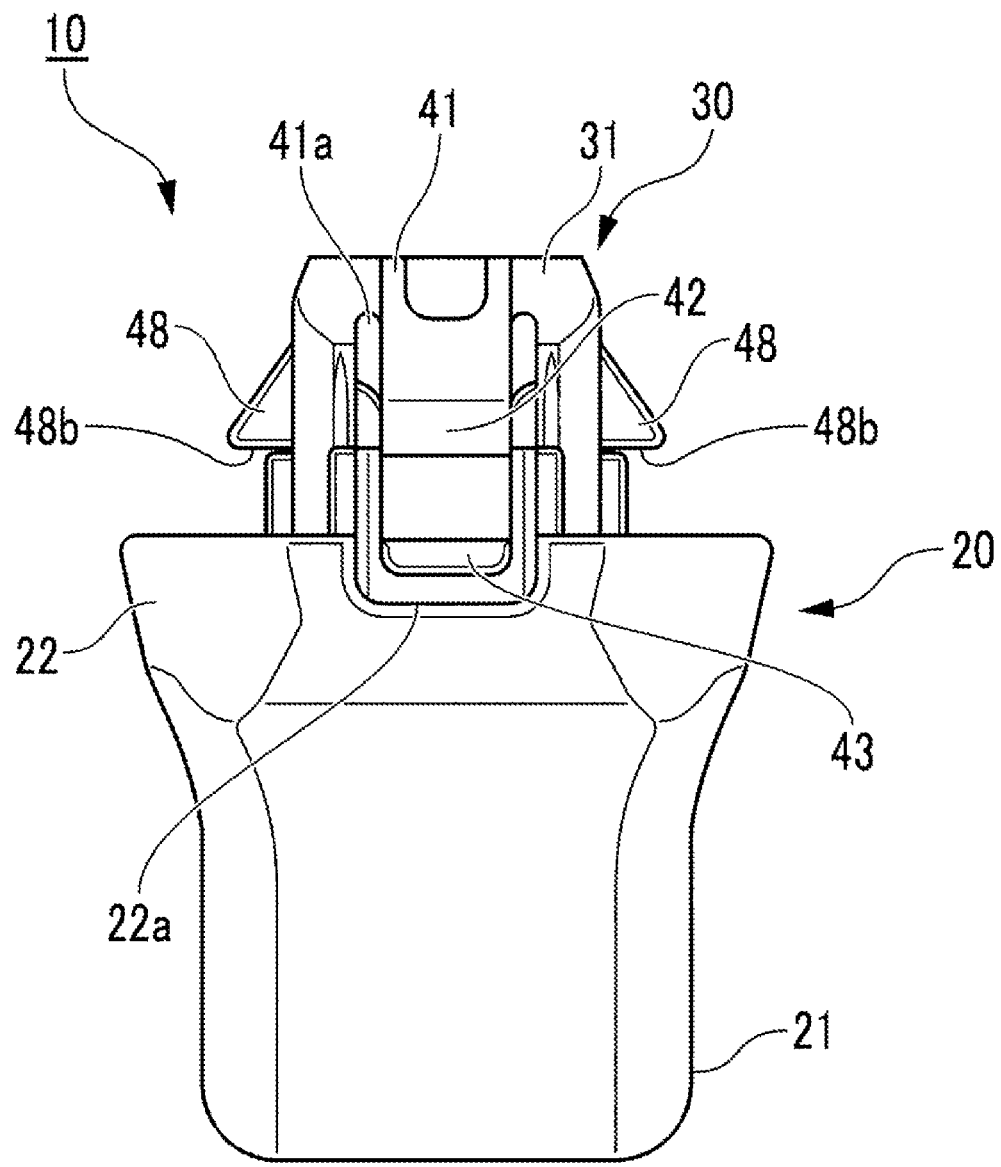
FIG. 6 is a rear view of the sun visor holder.
Figure 8:
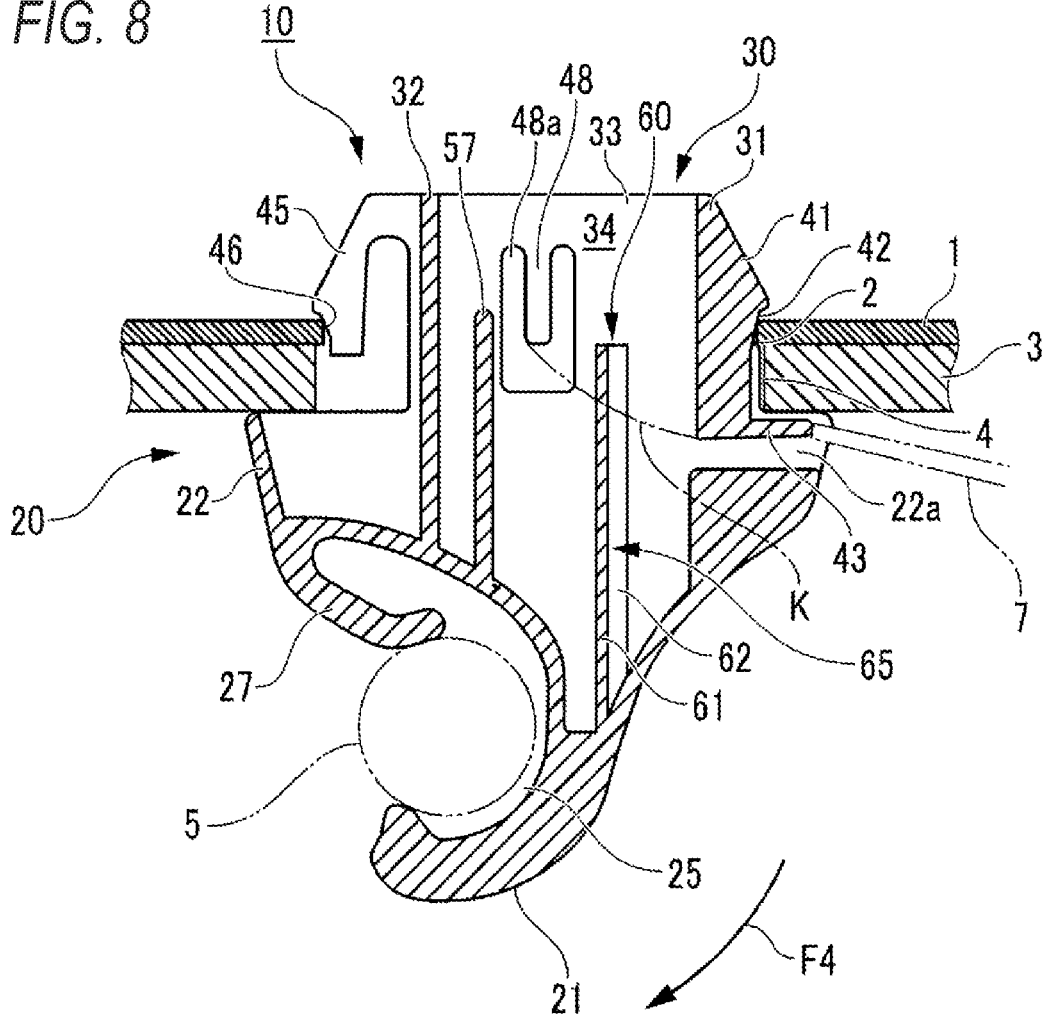
FIG. 8 is a cross-sectional view showing a state in which the sun visor holder is attached to a mounting hole.

The base portion 20 has a peripheral wall 22 and a bottom portion 23 (see FIG. 4), has a bottomed frame shape that extends long in one direction, and is in contact with a front side of the trim member 3 (see FIG. 8). As shown in FIG. 6, a substantially U-shaped cutout portion 22a is formed at one end of the base portion 20 in the longitudinal direction.

Figure 4:
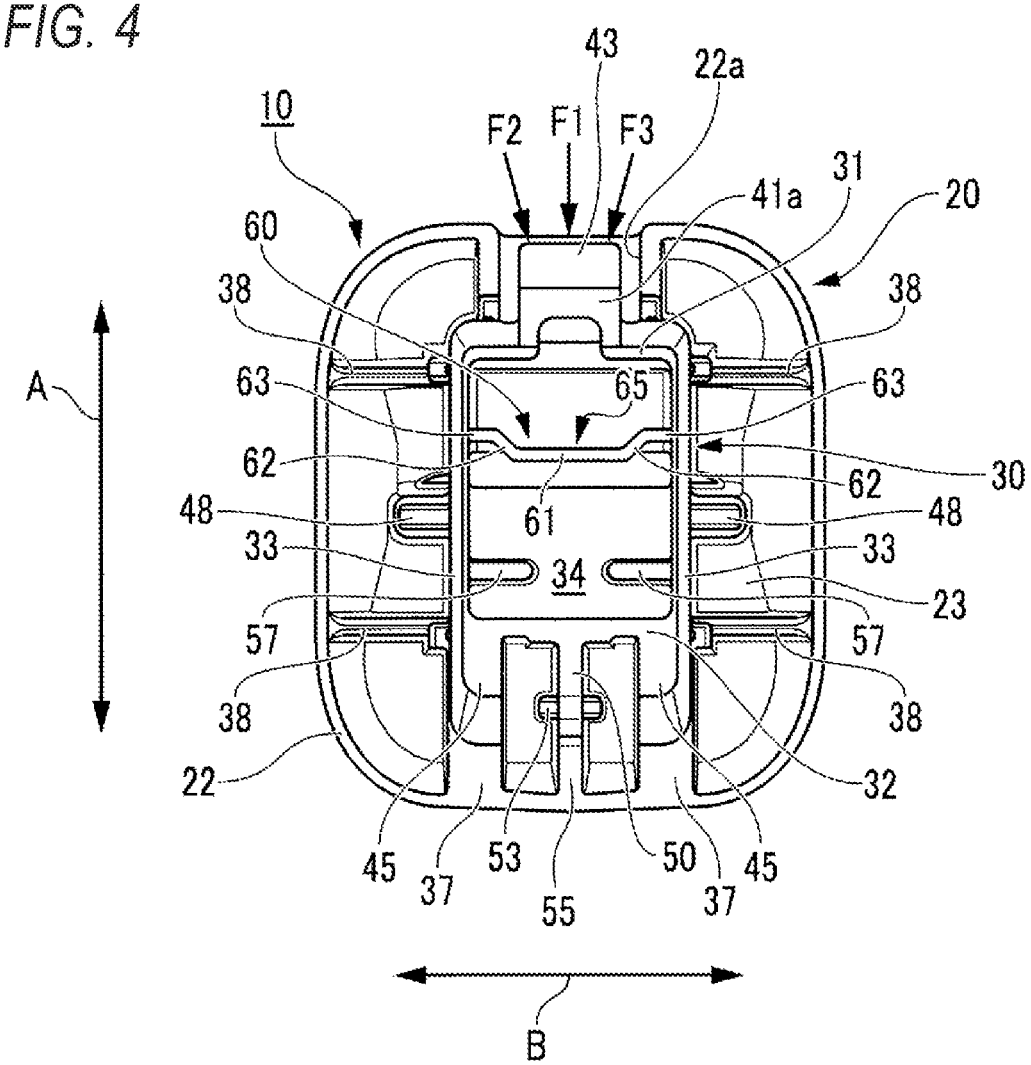
FIG. 4 is a plan view of the sun visor holder.

In a following description, as shown in FIG. 4, a direction along the longitudinal direction of the base portion 20 is referred to as a longitudinal direction A, and a direction orthogonal to the longitudinal direction A of the base portion 20 is referred to as a width direction B.

Figure 5:
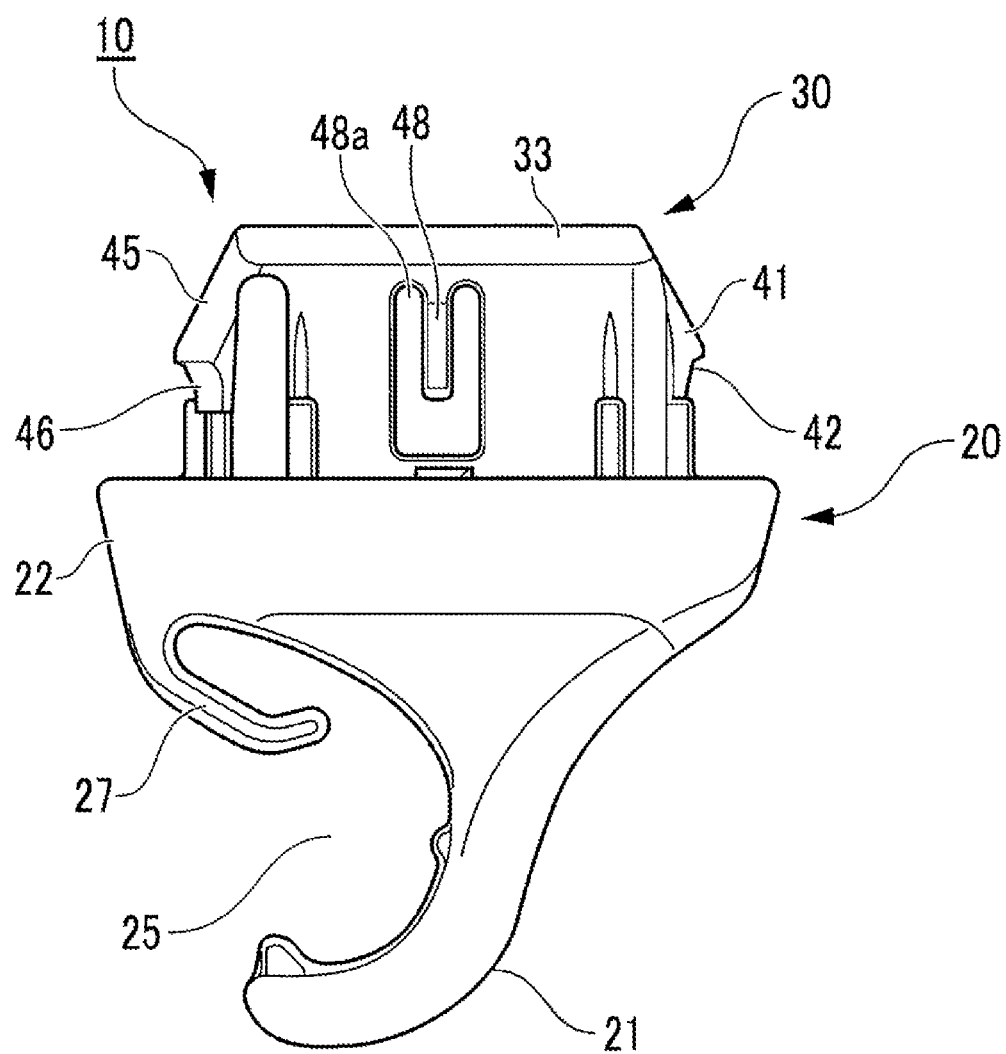
FIG. 5 is a right side view of the sun visor holder.

As shown in FIG. 5, the holding portion 21 extends from a portion close to one end portion in the longitudinal direction A of the base portion 20 so as to form a substantially C shape, and detachably holds the shaft 5 of the sun visor. An insertion portion 25 that receives the shaft 5 of the sun visor is provided inside the holding portion 21.

As shown in FIG. 5, a pressing piece 27 extends from the other end portion side in the longitudinal direction A of the base portion 20 so as to have a curved shape toward the insertion portion 25. The pressing piece 27 elastically contacts an outer circumference of the shaft 5 of the sun visor, and serves as a portion that prevents the shaft 5 from coming off and prevents rattling of the shaft 5 (see FIG. 8).

The leg portion 30 includes a first wall portion 31 and a second wall portion 32 that are vertically disposed from the base portion 20 and face each other.

As shown in FIGS. 2 and 4, the leg portion 30 in the embodiment includes the first wall portion 31 that is disposed on one end portion side in the longitudinal direction A of the base portion 20 and extends along the width direction B of the base portion 20, and the second wall portion 32 that is disposed on the other end portion side in the longitudinal direction A of the base portion 20 and extends along the width direction B of the base portion 20, and the two wall portions 31 and 32 are parallel to each other. The leg portion 30 has a pair of side wall portions 33, 33 that connect facing end portions of the two wall portions 31 and 32 to each other. The wall portions 31, 32, 33, and 33 are vertically disposed from the bottom portion 23 of the base portion 20 (see FIG. 8). As a result, the leg portion 30 has a substantially rectangular frame shape in which a tip end side in a vertical direction is opened and an internal space 34 is provided inside the leg portion 30.

As shown in FIG. 4, a base end portion side of the first wall portion 31 and the peripheral wall 22 of the base portion 20 are connected by connecting portions 36 and 36, a base end portion side of the second wall portion 32 and the peripheral wall 22 of the base portion 20 are connected by connecting portions 37 and 37, a base end portion side of each side wall portion 33 and the peripheral wall 22 of the base portion 20 are connected by connecting portions 38 and 38, and a rigidity of the leg portion 30 is maintained.

The first wall portion 31 includes a first engaging piece 41 that can be flexed and deformed by a slit 41a and engages with the mounting hole 2, and the first engaging piece 41 is provided with a release portion 43 that can release an engagement between the first engaging piece 41 and the mounting hole 2.

A specific description is made. As shown in FIG. 6, the substantially U-shaped slit 41a that communicates with the cutout portion 22a of the base portion 20 is formed in the first wall portion 31, and the first engaging piece 41 can be flexed by the slit 41a. A base end portion of the first engaging piece 41 is connected to a tip end portion side in the vertical direction of the first wall portion 31, and can be flexed and deformed in a direction approaching and separating from the second wall portion 32 (see FIGS. 8 and 12). An outer surface on the base end portion side of the first engaging piece 41 forms an inclined surface that gradually protrudes outward as the first engaging piece 41 goes toward the base portion 20, and an engaging portion 42 is formed that is inclined such that a height gradually decreases from a most protruding portion on outer surface on the base end portion side of the first engaging piece 41, and the engaging portion 42 is a portion that engages with a rear side peripheral edge of the mounting hole 2 (see FIG. 8).

As shown in FIG. 8, the release portion 43 extends toward a side opposite to the second wall portion 32 at a free end portion of the first engaging piece 41 on a side opposite to the base end portion of the first engaging piece 41. The release portion 43 is disposed in the cutout portion 22a of the peripheral wall 22 of the base portion 20 so as not to protrude from an outer peripheral surface of the base portion 20 (see FIGS. 6 and 8). Therefore, the release portion 43 has a structure in which the release portion 43 is hardly pushed by a finger or the like from an outside of the base portion 20, and when the release portion 43 is pushed in, the release portion 43 is pushed by, for example, a pushing tool 7 such as a flat head screwdriver, as shown in FIG. 8.

Figure 12:
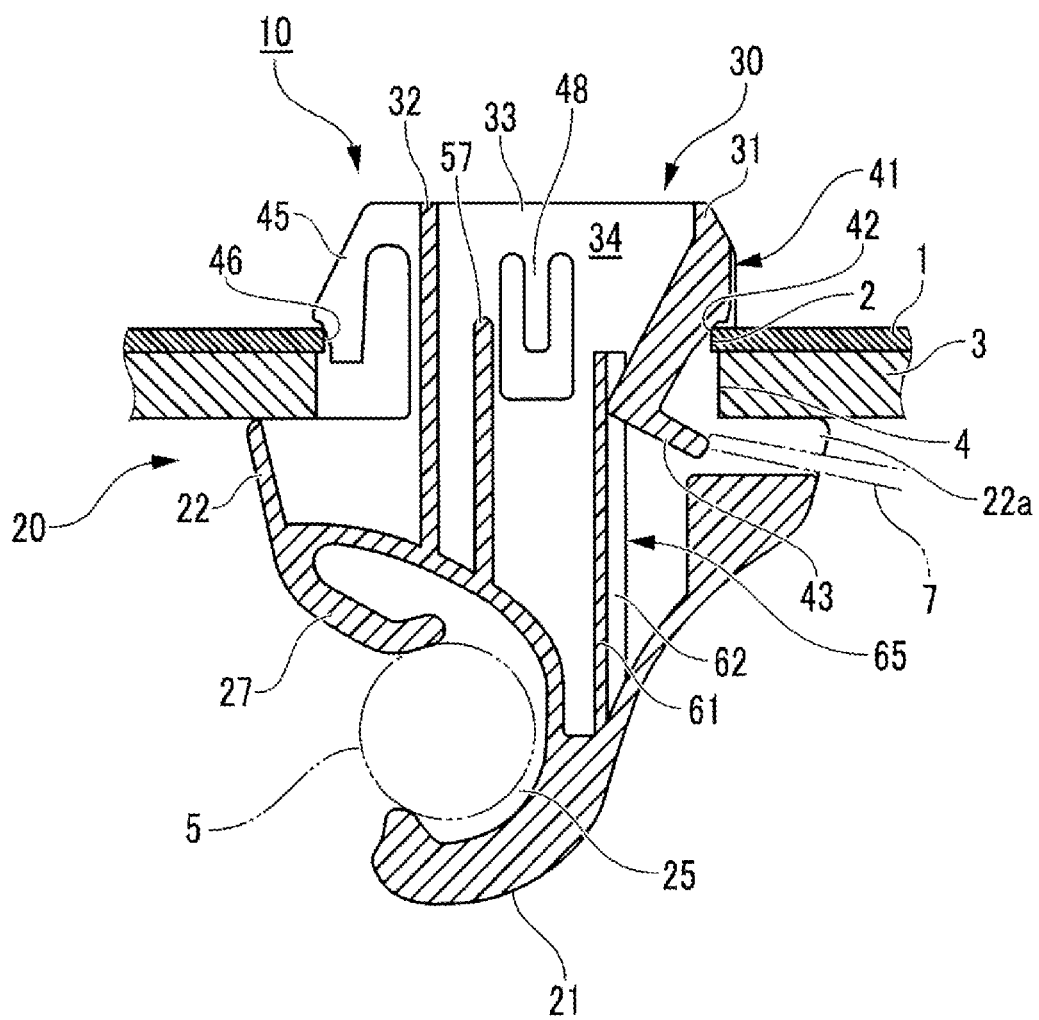
FIG. 12 is a cross-sectional view showing an action of a stopper wall when a first engaging piece is flexed and deformed when the sun visor holder is removed from the mounting hole.

Then, in a state where the engaging portion 42 of the first engaging piece 41 is engaged with the rear side peripheral edge of the mounting hole 2 (see FIG. 8), when the release portion 43 is pressed in a direction approaching the second wall portion 32 from the front side of the trim member 3 by the pushing tool 7, as shown in FIG. 12, via the release portion 43, the first engaging piece 41 is flexed and deformed while moving in the internal space 34 of the leg portion 30, the engaging portion 42 is disengaged from the rear side peripheral edge of the mounting hole 2, and the engagement of the first engagement piece 41 with the mounting hole 2 is released.

On the other hand, as shown in FIG. 2, the second wall portion 32 is provided with a pair of second engaging pieces 45, 45 whose base end portions are connected to a tip end side of the second wall portion 32 in the vertical direction of the second wall portion 32, and which can be flexed and deformed and are engaged with the mounting hole 2, and a vertical wall 50 that is disposed between the pair of second engaging pieces 45, 45 and extends in the vertical direction of the second wall portion.

As shown in FIGS. 2, 5, 8, and the like, the base end portion of the second engaging piece 45 is on an outer surface side of the second wall portion 32, and is connected to the tip end side in the vertical direction of the second wall portion 32, and extends obliquely outward toward a base portion 20 side. The "outer surface side" of the second wall portion 32 means a side of the second wall portion 32 opposite to a surface facing the first wall portion 31. The similar applies to a following description. An engaging portion 46 that engages with the rear side peripheral edge of the mounting hole 2 is provided on an outer surface of the second engaging piece 45 on a free end portion side opposite to the base end portion (see FIG. 8).

Further, as shown in FIGS. 2, 5, 8, and the like, substantially U-shaped slits 48a are formed in the pair of side wall portions 33, 33 that form the leg portion 30 at positions close to the second wall portion 32, and temporary holding pieces 48, 48 each having a substantially triangular plate shape that can be flexed toward the internal space 34 of the leg portion 30 are provided by the slits 48a. An engaging portion 48b is provided at one end portion of the temporary holding piece 48.

Then, the engaging portion 48b of the temporary holding piece 48 engages with a rear side peripheral edge of the insertion hole 4 of the trim member 3, and the base portion 20 contacts a front side peripheral edge of the insertion hole 4, so that the sun visor holder 10 is temporarily held with respect to the trim member 3.

As shown in FIGS. 2 and 4, the vertical wall 50 that extends in the vertical direction of the second wall portion 32 is extended between the pair of second engaging pieces 45, 45 on the outer surface side of the second wall portion 32. The vertical wall 50 in the embodiment has a substantially elongated plate shape in which an outer surface of a tip end is cut in a tapered shape, and extends from the bottom portion 23 of the base portion 20 to a tip end of the second wall portion 32 in the vertical direction of the second wall portion 32.

Further, groove portions 51 that extend in the vertical direction of the second wall portion 32 and thin the second wall portion 32 are formed on the second wall portion 32 between each of the second engaging pieces 45 and the vertical wall 50.

Figure 7:
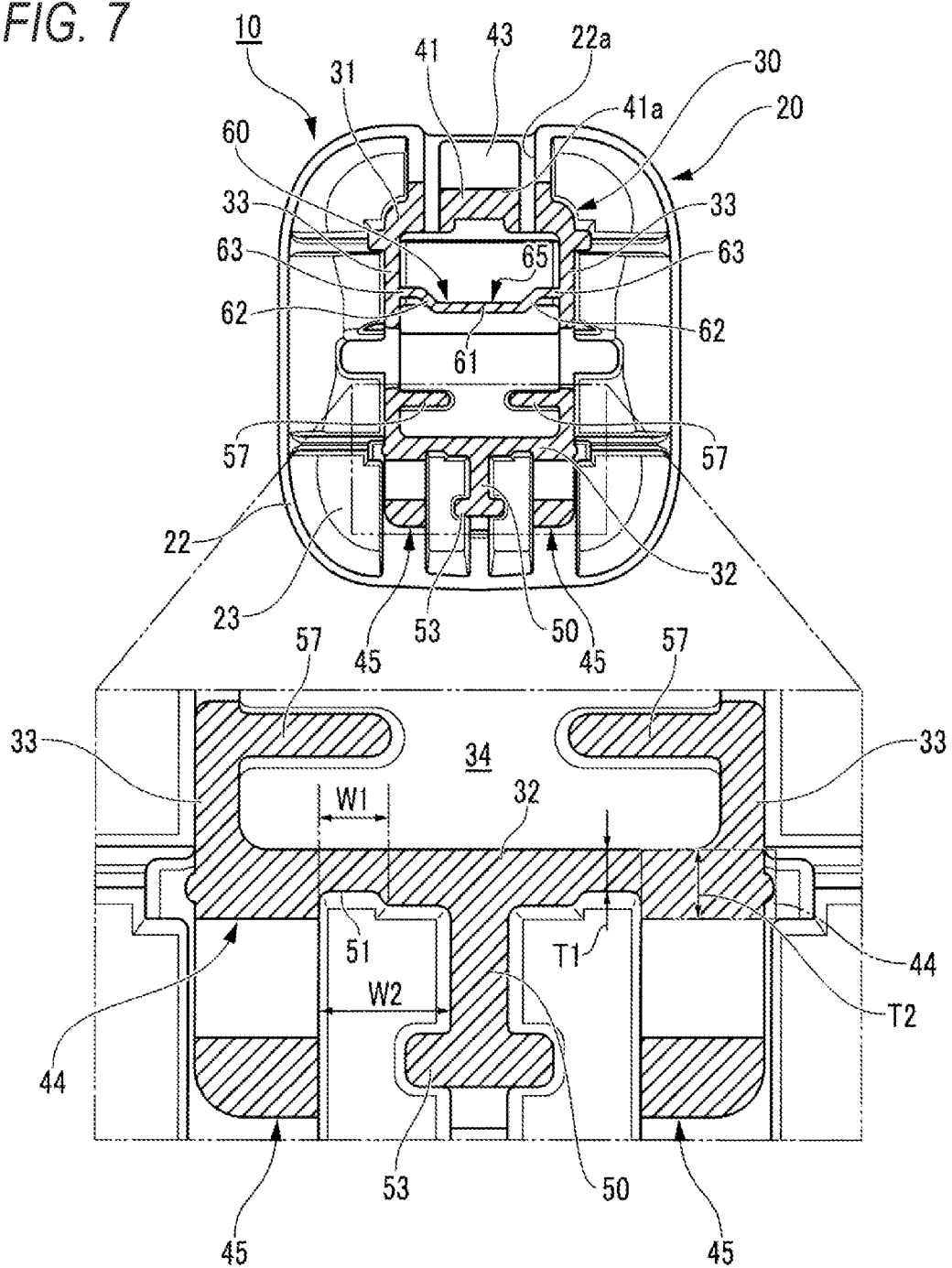
FIG. 7 is a partially cut-away plan view of the sun visor holder.

As shown in FIGS. 2, 4, and 7, the groove portion 51 in the embodiment has a substantially U-shaped groove shape, and is disposed on the outer surface side of the second wall portion 32 and on an inner side edge of the base end portion of the second engaging piece 45, and extends with a length reaching the bottom portion 23 of the base portion 20. As shown in FIG. 7, a width W1 of the groove portion 51 (in a direction along the width direction B) is narrower than an interval W2 between the vertical wall 50 and the second engaging piece 45 (in the direction along the width direction B).

By forming the groove portions 51, 51 as described above, as shown in FIG. 7, a thickness T2 of a connecting portion 44 between the base end portion of the second engaging piece 45 and a side portion in the width direction B of the second wall portion 32 is thicker than a thickness T1 of a portion where the groove portion 51 on the second wall portion 32 is formed. The connecting portion 44 is wider than the groove portion 51 (larger in the direction along the width direction B) and has a substantially square columnar shape (see FIG. 7).

Then, by providing the above groove portion 51, in a state where the sun visor holder 10 is attached to the mounting hole 2, after the engagement between the first engaging piece 41 and the mounting hole 2 is released, when the leg portion 30 is gradually pulled out from the mounting hole 2 in order to remove the leg portion 30 from the mounting hole 2 (a mode in which a pull-out load slowly acts on the second engaging piece 45), the second engaging piece 45 is easily flexed and deformed. In addition, by providing the groove portion 51, in a state where the sun visor holder 10 is attached to the mounting hole 2, when a sudden force such as an impact force acts from the outside (a mode in which a sudden pull-out load acts on the second engaging piece 45), the second engaging piece 45 is likely to be intentionally damaged. These actions and effects will be described later.

The groove portion 51 may have, for example, a substantially U shape, a substantially V shape, or the like, but a shape of the groove portion 51 is not particularly limited. A position where the groove portion is formed is not particularly limited, but the groove portion is preferably disposed along an inner side edge on a base end portion side of the second engaging piece 45. Further, a formation range of the groove portion (in a range along the vertical direction of the vertical wall) is also not particularly limited, but is preferably in a range where the base end portion of the second engaging piece 45 is provided.

Figure 9:
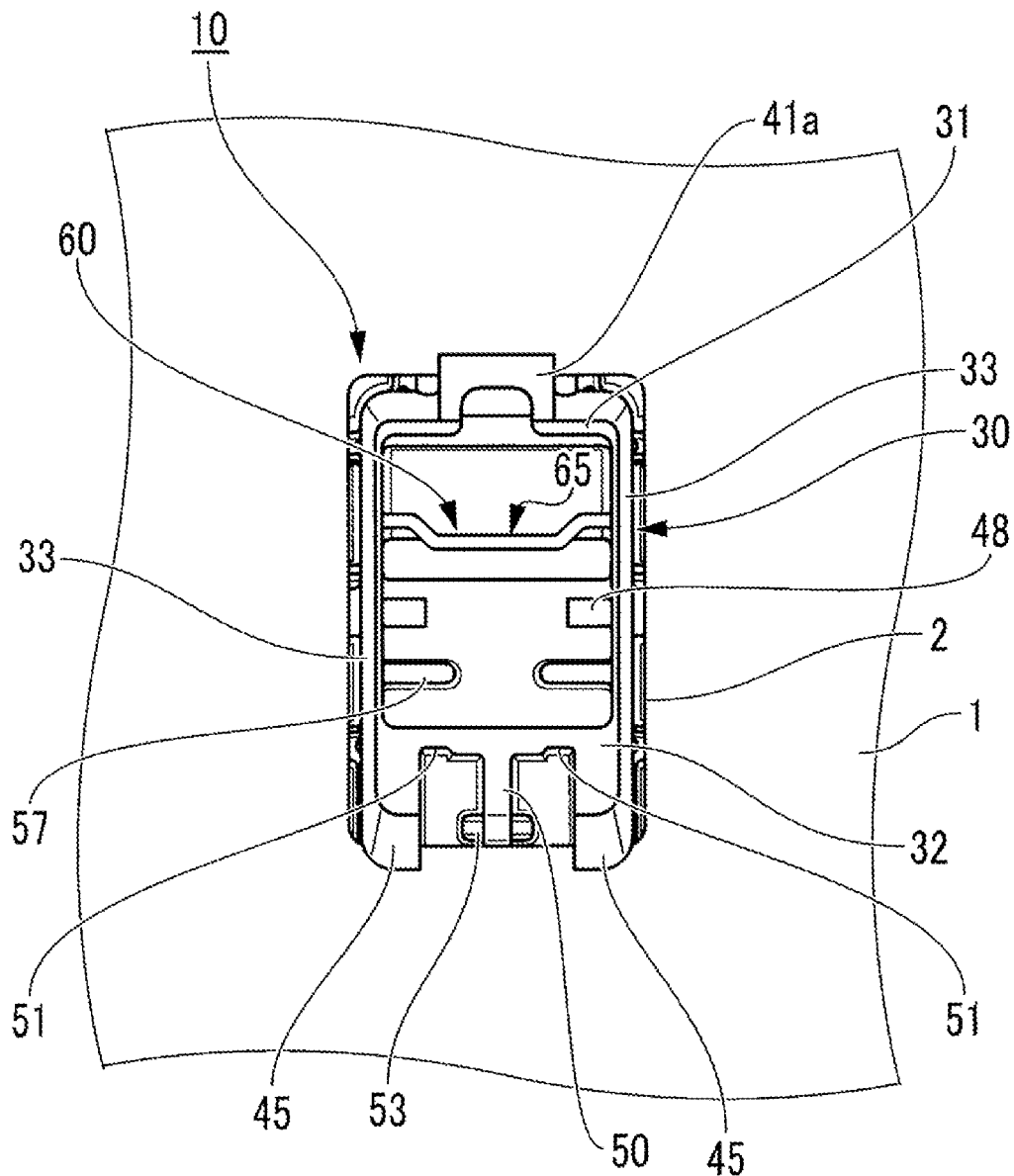
FIG. 9 is a plan view showing a state in which the sun visor holder is attached to the mounting hole.

As shown in FIG. 2, a wide portion 53 that can contact with an inner circumference of the mounting hole 2 is provided on a base end portion side of the vertical wall 50 (see FIG. 9).

Figure 3:
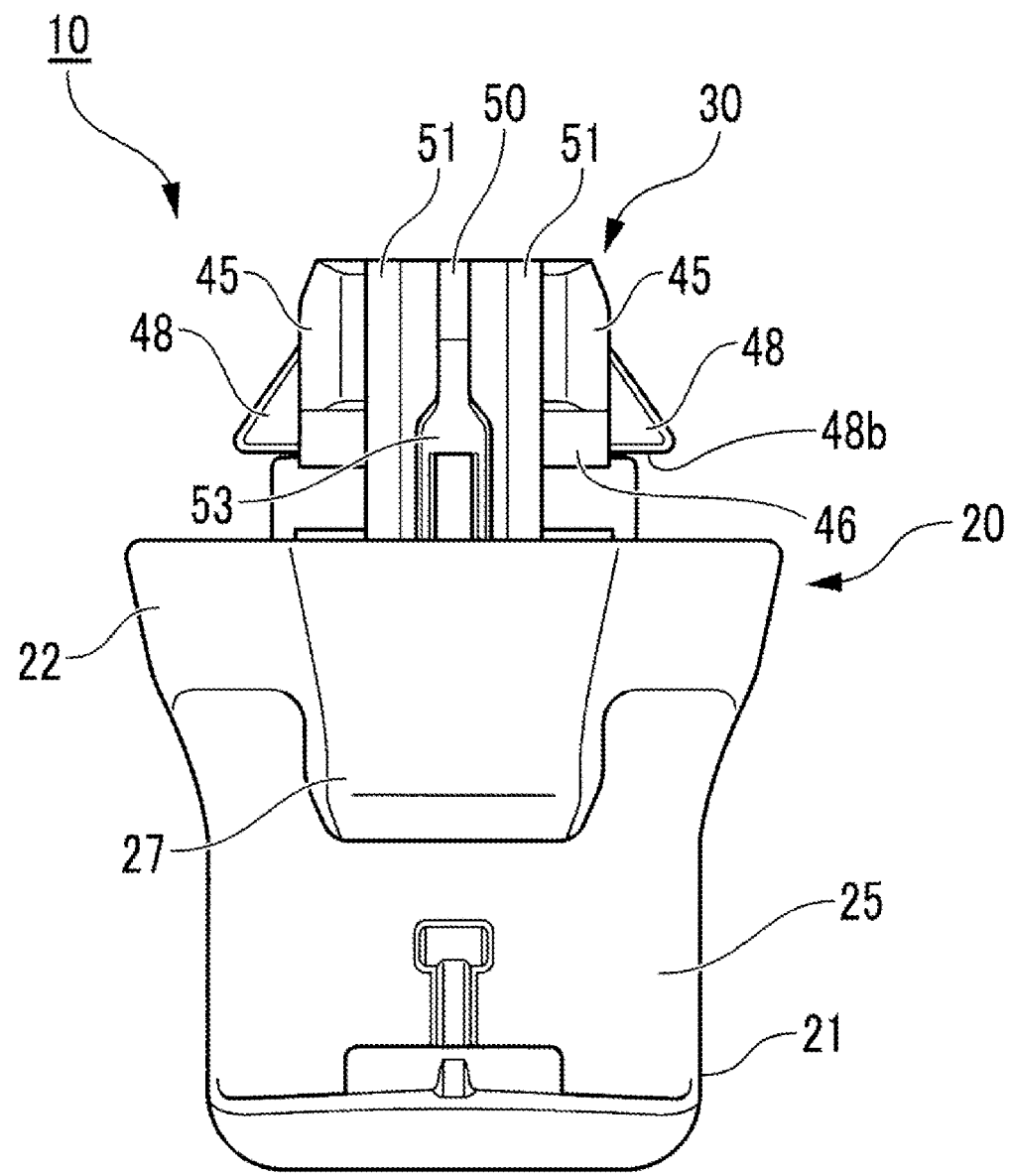
FIG. 3 is a front view of the sun visor holder.

The wide portion 53 in the embodiment has a shape protruding in a rib shape toward the pair of second engaging pieces 45, 45 on the base end portion side in the vertical direction, as shown in FIGS. 2 and 3, at a tip end side in a protruding direction of the vertical wall 50 from the second wall portion 32 (a position farthest from an outer surface of the second wall portion 32 in a plan view as shown in FIG. 7). As a result, as shown in FIGS. 2 and 3, the wide portion 53 has a wide width (a length along the width direction B) on a tip end portion side in the vertical direction of the vertical wall 50. Further, the wide portion 53 extends from the bottom portion 23 of the base portion 20.

In addition, as shown in FIGS. 2 and 4, the base end portion side of the vertical wall 50 and the peripheral wall 22 of the base portion 20 are connected by a connecting portion 55, and a rigidity of the vertical wall 50 is maintained.

Further, as shown in FIGS. 4 and 7, ribs 57, 57 are vertically disposed on inner surface sides (facing surface sides) of the pair of side wall portions 33, 33 that form the leg portion 30 and at positions approaching the second wall portion 32. The ribs 57, 57 improve rigidity and impact resistance of the pair of side wall portions 33, 33.

Figure 13:
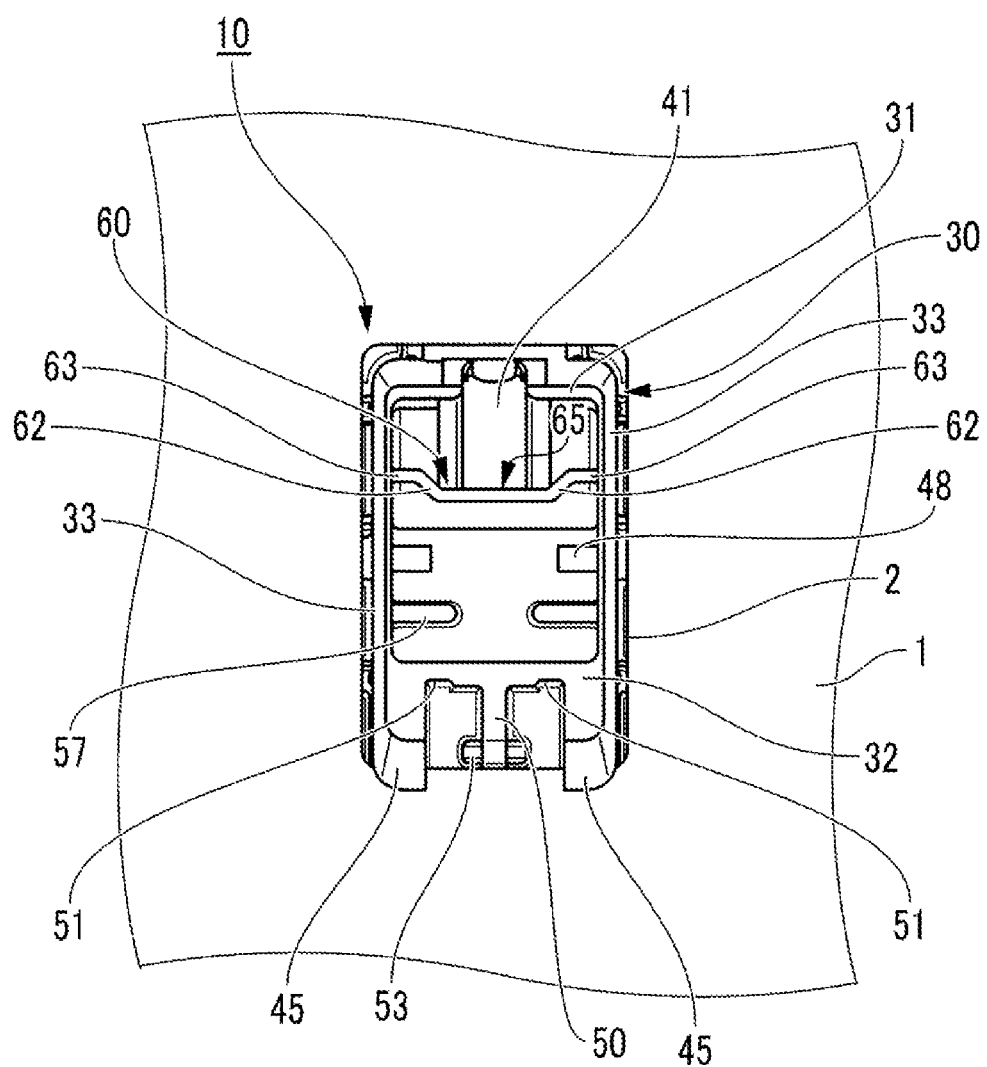
FIG. 13 is a plan view showing the action of the stopper wall when the first engaging piece is flexed and deformed when the sun visor holder is removed from the mounting hole.

Then, as shown in FIGS. 4 and 7, in the sun visor holder 10, a stopper wall 60 is provided that connects the pair of side wall portions 33, 33, and restricts flexural deformation of the second engaging piece 45 toward a first wall portion 31 side in a state where an engagement between the second engaging piece 45 and the mounting hole 2 is released. The stopper wall 60 is provided with a concave receiving portion 65 having two side surfaces in a tapered shape that guides the first engaging piece 41 to a center of the stopper wall 60 as shown in FIG. 13 when the first engaging piece 41 is flexed and deformed toward a second wall portion 32 side.

As shown in FIG. 7, in the embodiment, portions approaching the first wall portion 31 on the inner surface sides (facing surface sides) of the pair of side wall portions 33, 33 are connected by the stopper wall 60. Although a rotation trajectory K of the first engaging piece 41 is shown in FIG. 8, the stopper wall 60 of the embodiment is disposed in a middle of the rotation trajectory K, specifically, between the first wall portion 31 and the substantially U-shaped slit 48a through which the temporary holding piece 48 is formed.

In addition, the stopper wall 60 has a central portion 61 that is disposed at the center of the stopper wall and extends parallel to the first wall portion 31, a pair of inclined portions 62, 62 that extend obliquely from both sides of the central portion 61 so as to gradually approach the first wall portion 31, and a pair of connecting portions 63 and 63 that extend parallel to the first wall portion 31 from tip ends in an extending direction of the inclined portions 62, 62 and are respectively connected to the pair of side wall portions 33, 33. Two inner side surfaces (surfaces approaching each other) of the pair of inclined portions 62, 62 have a tapered shape. Then, the pair of inclined portions 62, 62 and the central portion 61 disposed between the pair of inclined portions 62, 62 form the concave receiving portion 65 in which the first wall portion 31 side is recessed and the two side surfaces of the concave receiving portion 65 are tapered in the plan view as shown in FIG. 7.

Shapes and structures of members (base portion, leg portion, first engaging piece, second engaging piece, and the like) of the above sun visor holder 10 are merely examples, and are not limited to shapes and structures described above.

Next, a method of using the sun visor holder 10 configured as described above is described.

First, as shown in FIG. 1, the leg portion 30 of the sun visor holder 10 is inserted into the insertion hole 4 from the front side of the trim member 3. Then, when the first engaging piece 41, the second engaging pieces 45, 45, and the temporary holding pieces 48, 48 are pressed against an inner circumference of the insertion hole 4 and pass through the insertion hole 4 while flexing inward, when the pieces 41, 45, and 48 come out from a rear side of the insertion hole 4 and elastically return, the engaging portion 48b of the temporary holding piece 48 engages with the rear side peripheral edge of the insertion hole 4, the base portion 20 contacts the front side peripheral edge of the insertion hole 4, and the sun visor holder 10 is temporarily held by the trim member 3.

As described above, in a state in which the sun visor holder 10 is temporarily held by the trim member 3 and the tip end side of the leg portion 30 protrudes from the rear side of the insertion hole 4, the sun visor holder 10 is pushed toward a vehicle panel 1 side together with the trim member 3, and the leg portion 30 of the sun visor holder 10 is inserted into the mounting hole 2 from the front side of the vehicle panel 1. Then, the first engaging piece 41, the second engaging pieces 45, 45, and the temporary holding pieces 48, 48 are pressed against the inner circumference of the mounting hole 2 and flex toward an inner side of the leg portion, and when the engaging portion 42 of the first engaging piece 41 and the engaging portion 46 of the second engaging piece 45 pass through the mounting hole 2, the first engaging piece 41 and the second engaging piece 45 elastically return and engage with the rear side peripheral edge of the mounting hole 2 (see FIG. 8), and the temporary holding piece 48 flexes inward and is held in a state of contacting the inner circumference of the mounting hole 2. As a result, as shown in FIG. 8, the vehicle panel 1 and the trim member 3 are sandwiched between the base portion 20 that contacts the insertion hole 4 of the trim member 3 and the first engaging piece 41 and the pair of second engaging pieces 45, 45 that are engaged with the rear side peripheral edge of the mounting hole 2, and the sun visor holder 10 can be attached to the mounting hole 2 in a state where the flexible trim member 3 is slightly crushed. In this state, as shown in FIG. 9, the wide portion 53 provided on the base end portion side of the vertical wall 50 can contact the inner circumference of the mounting hole 2.

Then, when the shaft 5 of the sun visor is inserted into the holding portion 21 through the opened insertion portion 25, the pressing piece 27 elastically contacts the outer circumference of the shaft, and in a state where the rattling of the shaft 5 is prevented, the shaft 5 is detachably rotated and held by the holding portion 21 and the sun visor can be fixed to the vehicle panel 1 and the trim member 3.

When a user wants to remove the sun visor holder 10 from the mounting hole 2 of the vehicle panel 1 for reasons such as component replacement, maintenance, and recycling, as shown in FIG. 8, the release portion 43 is pushed toward the direction approaching the second wall portion 32 from the front side of the trim member 3 by, for example, the pushing tool 7 such as the flat head screwdriver. Then, as shown in FIG. 12, the first engaging piece 41 is flexed and deformed in the direction approaching the second wall portion 32 while moving in the internal space 34 of the leg portion 30 via the release portion 43. As a result, the engaging portion 42 is disengaged from the rear side peripheral edge of the mounting hole 2, and the engagement of the first engagement piece 41 with the mounting hole 2 is released.

Then, in the embodiment, as shown in FIGS. 4 and 7, the stopper wall 60 is provided that connects the pair of side wall portions 33, 33, and restricts flexural deformation of the first engaging piece 41 toward the second wall portion 32 side in a state where the engagement between the first engaging piece 41 and the mounting hole 2 is released, and the stopper wall 60 is provided with the concave receiving portion 65 having the two side surfaces in the tapered shape that guides the first engaging piece 41 to the center of the stopper wall 60 when the first engaging piece 41 is flexed and deformed toward the second wall portion 32 side.

Therefore, when the release portion 43 is pushed in by the pushing tool 7 and the first engaging piece 41 is flexed and deformed, even if the release portion 43 is excessively pressed, as shown in FIG. 12, the first engaging piece 41 contacts the stopper wall 60, so that further flexural deformation of the first engaging piece 41 can be restricted. As a result, plastic deformation of the first engaging piece 41 can be prevented.

Although it is desirable to push the release portion 43 straight toward the second wall portion 32 side as indicated by an arrow F1 in FIG. 4 while the release portion 43 is pushed in by the pushing tool 7, the release portion 43 may be pushed obliquely as indicated by arrows F2 and F3 in FIG. 4. In this case, the first engaging piece 41 deviates from a center position of the stopper wall 60 and is flexed and deformed while being bent, but as shown in FIG. 13, the first engaging piece 41 is guided by the concave receiving portion 65 having the two side surfaces in the tapered shape (here, the first engaging piece 41 is guided by the two inner side surfaces of the inclined portion 62 having the tapered shape), and the first engaging piece 41 can be positioned at the center of the stopper wall 60, and a restriction on the flexural deformation of the first engaging piece 41 can be reliably achieved.

Further, since the stopper wall 60 is provided with the concave receiving portion 65 having the two side surfaces in the tapered shape, a rigidity of the stopper wall 60 itself can be increased (the rigidity of the stopper wall 60 is higher than that of a configuration without the concave receiving portion).

Since the stopper wall 60 is provided approaching the first wall portion 31 and is separated from the second wall portion 32, it is possible to increase strengths of the pair of side wall portions 33, 33 while preventing ease of deformation of the second wall portion 32, which will be described later.

Returning to a description of a procedure of removing the sun visor holder 10 from the mounting hole 2, while holding a state in which the engaging portion 42 is disengaged from the rear side peripheral edge of the mounting hole 2 and the engagement of the first engaging piece 41 with the mounting hole 2 is released as described above, as indicated by an arrow F4 in FIG. 8, the base portion 20 is rotated in a direction away from the front side of the trim member 3, and the leg portion 30 is gradually pulled out from the one end portion side (sides of the first wall portion 31 and the first engaging piece 41) in the longitudinal direction A from the mounting hole 2.

At this time, in the sun visor holder 10, as shown in FIGS. 2, 4, and 7, the groove portion 51 on the second wall portion 32 that extends in the vertical direction of the second wall portion 32 and thins the second wall portion 32 is formed between the second engaging piece 45 and the vertical wall 50. Therefore, as shown in FIG. 10, the pair of second engaging pieces 45, 45 can be easily flexed and deformed in the direction approaching the second wall portion 32, and can be easily flexed and deformed in directions approaching each other.

Figure 10:
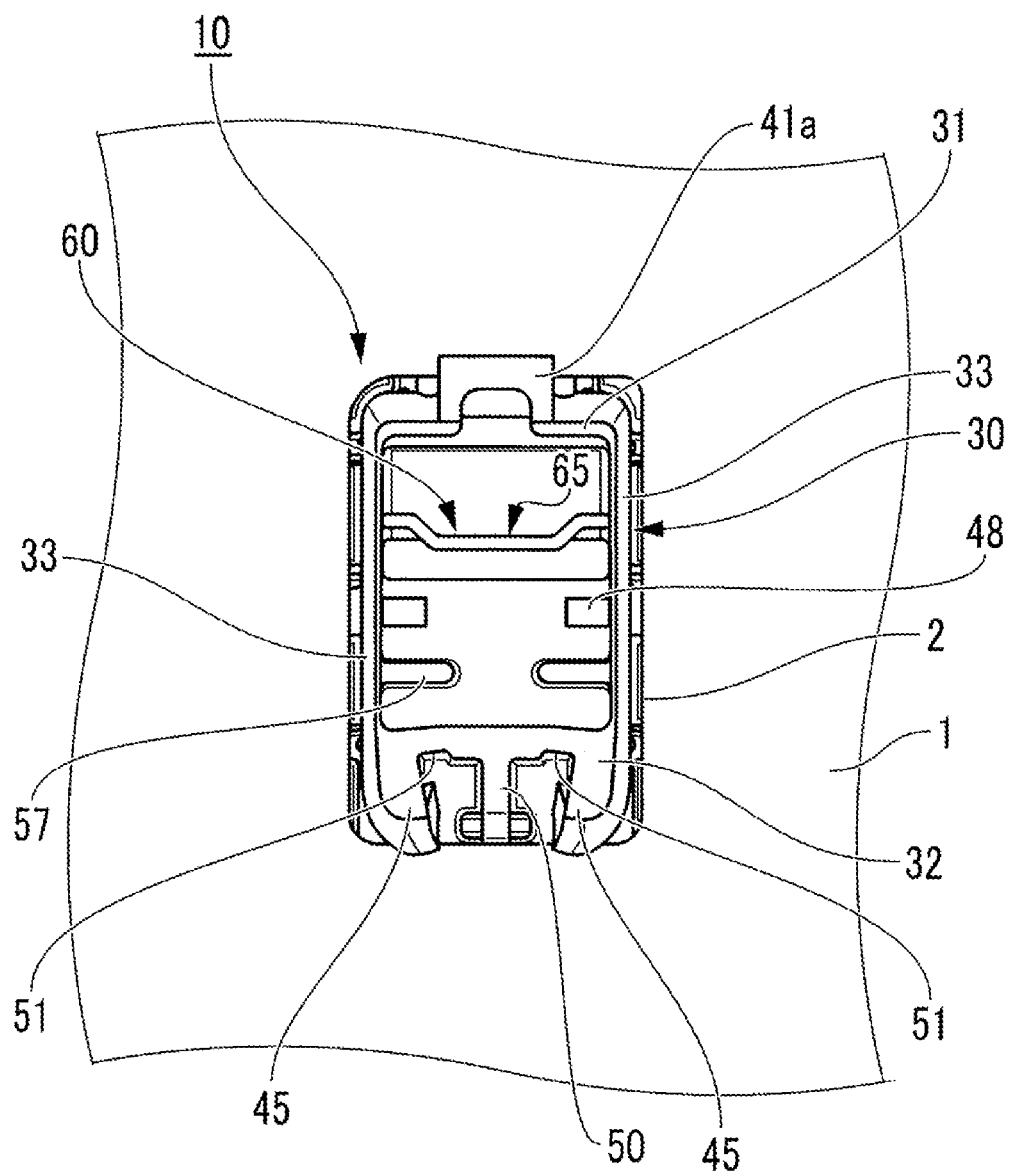
FIG. 10 is a plan view showing a state of flexural deformation of a pair of second engaging pieces when the sun visor holder is removed from the mounting hole.

Here, as shown in FIG. 10, thin portions on the second wall portion 32 where the groove portions 51, 51 are formed are slightly bent obliquely inward so as to approach the first wall portion 31 (that is, the second wall portion 32 is bent and deformed in a direction in which two side portions approach each other), and the pair of second engaging pieces 45, 45 are flexed and deformed obliquely inward in a direction approaching the outer surface side of the second wall portion 32 and in the directions approaching each other with the vertical wall 50 interposed between the pair of second engaging pieces 45.

As a result, since the engagement between the pair of second engaging pieces 45, 45 and the mounting hole 2 can be easily released by reducing an engagement margin of the engaging portion 46 of the second engaging piece 45 with respect to the mounting hole 2, the leg portion 30 is easily pulled out from the mounting hole 2, and the sun visor holder 10 is easily removed from the mounting hole 2.

As described above, since the pair of second engaging pieces 45, 45 are easily flexed and deformed in the direction approaching the second wall portion 32 and are also easily flexed and deformed in the directions approaching each other, an engagement margin of the engaging portion 46 with respect to the mounting hole 2 is easily secured, and an effect that the sun visor holder 10 can be firmly attached to the mounting hole 2 is also obtained.

In the embodiment, as shown in FIGS. 4 and 7, the groove portion 51 is formed on the outer surface side of the second wall portion 32. Therefore, when the sun visor holder 10 is removed from the mounting hole 2, as shown in FIG. 10, the second wall portion 32 is bent and deformed so as to approach the first wall portion 31 while the two side portions come close to each other, so that the pair of second engaging pieces 45, 45 can be easily flexed and deformed in the directions approaching each other.

Further, in the embodiment, as shown in FIGS. 2 and 4, the groove portion 51 is disposed along the inner side edge of the base end portion side of the second engaging piece 45, and as shown in FIG. 7, the width W1 of the groove portion 51 is narrower than the interval W2 between the vertical wall 50 and the second engaging piece 45. Therefore, the pair of second engaging pieces 45, 45 can be more easily flexed and deformed while preventing strength of the second wall portion 32 from being lowered.

In the embodiment, as shown in FIG. 9, the wide portion 53 that can contact the inner circumference of the mounting hole 2 is provided on the base end portion side of the vertical wall 50. Therefore, in a state where the sun visor holder 10 is attached to the mounting hole 2, when an impact force acts from the outside, the impact force can be easily received, breakage of the vertical wall 50 can be prevented, and the sun visor holder 10 can be made less likely to be disengaged from the mounting hole 2.

Figure 11:
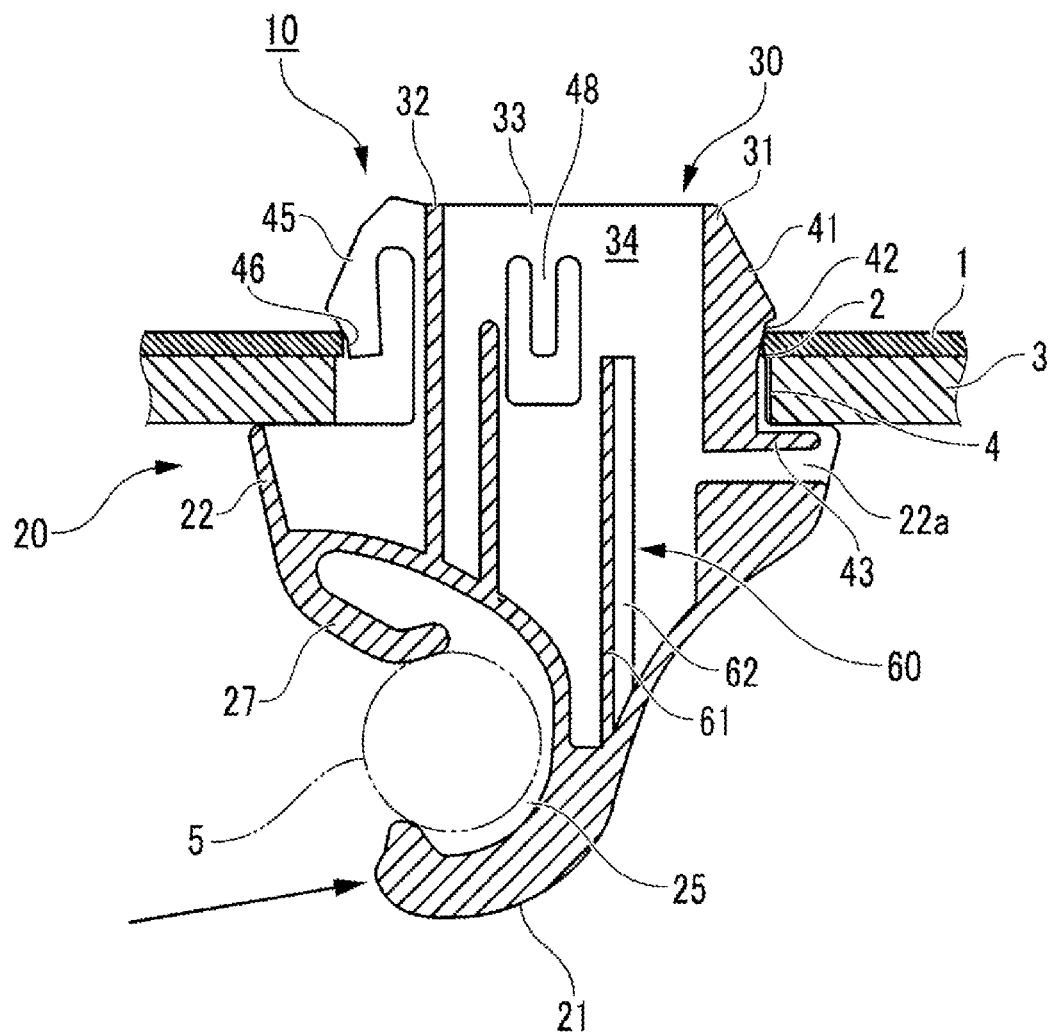
FIG. 11 is a cross-sectional view showing a state of flexural deformation of the pair of second engaging pieces when an impact force or the like acts from an outside in a state in which the sun visor holder is attached to the mounting hole.

A sudden force such as an impact force may act on the sun visor holder 10 in the state of being attached to the mounting hole 2. For example, as indicated by an arrow in FIG. 11, an impact force may act obliquely from the outside on a tip end side in an extending direction of the holding portion 21. At this time, a load much larger than a pull-out load when removing the sun visor described above acts. In this case, in the sun visor holder 10, as shown in FIG. 11, the base end portion of the second engaging piece 45 slightly protrudes from a tip end portion in the vertical direction of the leg portion 30, and an inner surface side of the second engaging piece 45 is flexed and deformed so as to be close to the second wall portion 32, but it is difficult to flex and deform in the directions approaching each other.

Therefore, the second engaging piece 45 can be easily damaged intentionally (since shear stress is concentrated on the base end portion side of the second engaging piece 45 in a short time, the second engaging piece 45 is easily damaged), and the sun visor holder 10 can be easily disengaged from the mounting hole 2. In the embodiment, as described above, the groove portion 51 is formed on the outer surface side of the second wall portion 32, and is disposed along the inner side edge on the base end portion side of the second engaging piece 45, the width W1 of the groove portion 51 is narrower than the interval W2 between the vertical wall 50 and the second engaging piece 45, so that the second engaging piece 45 is more likely to be damaged when a sudden external force such as an impact force acts as described above.

The present invention is not limited to the embodiment described above, and various modifications can be made without departing from the gist of the present invention, and such embodiments are also included in the scope of the present invention.

REFERENCE SIGNS LIST

2 mounting hole
5 shaft
10 sun visor holder
20 base portion
21 holding portion
30 leg portion
31 first wall portion
32 second wall portion
33, 33 side wall portion
41 first engaging piece
43 release portion
45 second engaging piece
50 vertical wall
51, 51 groove portion
53 wide portion
60 stopper wall
65 concave receiving portion

The invention claimed is:

1. A sun visor holder that is attached to a mounting hole and configured to detachably hold a shaft of a sun visor, the sun visor holder comprising:
a base portion that includes a holding portion holding the shaft and a leg portion that is inserted into and fixed to the mounting hole, wherein
the leg portion includes a first wall portion and a second wall portion that are vertically disposed from the base portion and face each other,
the first wall portion includes a first engaging piece that is configured to be flexed and deformed by forming a slit and engages with the mounting hole, and the first engaging piece is provided with a release portion that is configured to release an engagement between the first engaging piece and the mounting hole,
the second wall portion is provided with a pair of second engaging pieces whose base end portions are connected to a tip end side of the second wall portion in a vertical direction thereof, and which are configured to be flexed and deformed and are engaged with the mounting hole, and a vertical wall that is disposed between the pair of second engaging pieces and extends in the vertical direction of the second wall portion,
groove portions that extend in the vertical direction of the second wall portion and thin the second wall portion are formed on the second wall portion between each of the second engaging pieces and the vertical wall, and
a width of each of the groove portions is narrower than an interval between the vertical wall and each of the second engaging pieces.

2. The sun visor holder according to claim 1, wherein each of the groove portions is formed on an outer surface side of the second wall portion.

3. The sun visor holder according to claim 1, wherein each of the groove portions is disposed along an inner side edge of a base end portion side of each of the second engaging pieces.

4. The sun visor holder according to claim 1, wherein an expanded portion that is configured to contact an inner circumference of the mounting hole is provided on a base end portion side of the vertical wall.

5. The sun visor holder according to claim 1, wherein the leg portion includes a pair of side wall portions that connect the first wall portion and the second wall portion,
the sun visor holder is provided with a stopper wall that connects the pair of side wall portions, and restricts flexural deformation of the first engaging piece toward the second wall portion in a state where the engagement between the first engaging piece and the mounting hole is released, and
the stopper wall is provided with a concave receiving portion having two side surfaces in a tapered shape that guides the first engaging piece to a center of the stopper wall when the release portion is pressed and the first engaging piece is flexed and deformed toward the second wall portion.

\* \* \* \* \*